United States Patent
Tandon et al.

(10) Patent No.: US 12,266,815 B2
(45) Date of Patent: Apr. 1, 2025

(54) REINFORCEMENT FRAME FOR A BATTERY PACK OF AN ELECTRIC OR HYBRID VEHICLE, REINFORCED BATTERY PACK AND PROCESS FOR ASSEMBLING SAID BATTERY PACK

(71) Applicant: ArcelorMittal, Luxembourg (LU)

(72) Inventors: Gagan Tandon, Canton, MI (US); Robert Zummallen, Marysville, OH (US)

(73) Assignee: ArcelorMittal, Luxembourg (LU)

( * ) Notice: Subject to any disclaimer, the term of this patent is extended or adjusted under 35 U.S.C. 154(b) by 307 days.

(21) Appl. No.: 17/783,965

(22) PCT Filed: Dec. 8, 2020

(86) PCT No.: PCT/IB2020/061635
§ 371 (c)(1),
(2) Date: Jun. 9, 2022

(87) PCT Pub. No.: WO2021/124012
PCT Pub. Date: Jun. 24, 2021

(65) Prior Publication Data
US 2023/0041000 A1  Feb. 9, 2023

(30) Foreign Application Priority Data
Dec. 18, 2019  (WO) .................. PCT/IB2019/061006

(51) Int. Cl.
*H01M 50/249*  (2021.01)
*B60L 50/60*  (2019.01)
(Continued)

(52) U.S. Cl.
CPC .......... *H01M 50/249* (2021.01); *B60L 50/64* (2019.02); *B60L 50/66* (2019.02); *H01M 50/236* (2021.01);
(Continued)

(58) Field of Classification Search
CPC ............. H01M 50/249; H01M 50/236; H01M 50/262; H01M 2220/20; H01M 50/20;
(Continued)

(56) References Cited

U.S. PATENT DOCUMENTS 8,967,312 B2  3/2015 Yanagi et al.
11,034,227 B2 *  6/2021 Spielvogel .......... H01M 10/647
(Continued)

FOREIGN PATENT DOCUMENTS

DE  102013215276 A1  2/2014
DE  102016115037 A1 *  2/2018  .......... H01M 2/1072
(Continued)

OTHER PUBLICATIONS

EP-2685523-A1 English Translation (Year: 2014).*
(Continued)

*Primary Examiner* — James A Shriver, II
*Assistant Examiner* — Michael T. Walsh
(74) *Attorney, Agent, or Firm* — Davidson Kappel LLC (57) ABSTRACT

A reinforcement frame (1) for a battery pack (2) of an electric or hybrid vehicle (37), the battery pack including a plurality of battery cells lying on and secured to a shield element, the reinforcement frame including at least: a reinforcement frame fastening portion (3) provided to be secured to both the battery pack and the body of the vehicle, and a reinforcement frame hollow portion (4) provided to surround at least the battery cells.

14 Claims, 6 Drawing Sheets

(51) Int. Cl.
*B60L 50/64* (2019.01)
*H01M 50/236* (2021.01)
*H01M 50/262* (2021.01)

(52) U.S. Cl.
CPC ...... *H01M 50/262* (2021.01); *H01M 2220/20* (2013.01)

(58) Field of Classification Search
CPC ............. H01M 50/224; H01M 50/207; H01M 50/242; B60L 50/64; B60L 50/66; Y02E 60/10; B60K 2001/0438; B60K 1/04; B60Y 2306/01; B60Y 2200/91; B60Y 2200/92; B62D 25/08; Y02T 10/70
See application file for complete search history.

(56) References Cited

U.S. PATENT DOCUMENTS

| | | | |
|---|---|---|---|
| 2005/0260488 A1 | 11/2005 | Zhou et al. | |
| 2011/0143179 A1* | 6/2011 | Nakamori | H01M 50/271 |
| | | | 429/99 |
| 2011/0300427 A1 | 12/2011 | Isawa et al. | |
| 2012/0211128 A1 | 8/2012 | Corquillet et al. | |
| 2012/0247850 A1 | 10/2012 | Hashimoto et al. | |
| 2014/0014428 A1 | 1/2014 | Yanagi | |
| 2014/0158444 A1 | 6/2014 | Han et al. | |
| 2015/0249240 A1* | 9/2015 | Hihara | H01M 8/2475 |
| | | | 180/68.5 |
| 2016/0288737 A1 | 10/2016 | Kamimura et al. | |
| 2017/0029040 A1* | 2/2017 | Meaige | B62D 25/04 |
| 2018/0043763 A1 | 2/2018 | Suzumori et al. | |
| 2018/0171459 A1 | 6/2018 | Drillet et al. | |
| 2018/0236863 A1 | 8/2018 | Kawabe et al. | |
| 2019/0036092 A1 | 1/2019 | Guenther et al. | |
| 2019/0106765 A1 | 4/2019 | Moulin et al. | |
| 2019/0131602 A1* | 5/2019 | Hilfrich | H01M 50/278 |
| 2019/0237725 A1 | 8/2019 | Kawaguchi et al. | |
| 2019/0381899 A1 | 12/2019 | Guenther et al. | |

FOREIGN PATENT DOCUMENTS

| | | | | |
|---|---|---|---|---|
| DE | 102016115611 B3 | | 2/2018 | |
| DE | 102017102685 A1 | | 8/2018 | |
| DE | 102017105709 A1 | | 9/2018 | |
| DE | 102016120826 | | 11/2020 | |
| DE | 102019102754 B4 * | | 3/2022 | ............... B60K 1/00 |
| EP | 2371599 A1 | | 10/2011 | |
| EP | 2685523 A1 * | | 1/2014 | ............... B60K 1/04 |
| JP | 2007126151 A | | 5/2007 | |
| JP | 2011143892 A | | 7/2011 | |
| JP | 2011194982 A | | 10/2011 | |
| JP | 2019147423 A | | 9/2019 | |
| KR | 20110112436 | | 10/2011 | |
| WO | WO2017125809 A | | 7/2017 | |
| WO | WO-2017125809 A1 * | | 7/2017 | ........... B32B 15/013 |
| WO | WO 2018029168 | | 2/2018 | |
| WO | WO-2018082896 A1 * | | 5/2018 | ............... B60K 1/04 |
| WO | WO 2018/166888 | | 9/2018 | |
| WO | WO 2021/130522 A1 | | 7/2021 | |
| WO | WO 2021/130606 A1 | | 7/2021 | |

OTHER PUBLICATIONS

WO-2017125809-A1 English Translation (Year: 2017).*
DE-102019102754-B4 English Translation (Year: 2022).*
Search Report of PCT/IB2020/061326 dated Oct. 13, 2020.
See written opinion of PCT/IB2020/061326.
ISR of PCT/IB2020/061946 dated Feb. 15, 2021.
Written opinion of ISA of PCT/IB2020/061946.
ISR of PCT/IB2020/061725 dated Feb. 2, 2021.
Written opinion of ISA of PCT/IB2020/061725.

* cited by examiner

REINFORCEMENT FRAME FOR A BATTERY PACK OF AN ELECTRIC OR HYBRID VEHICLE, REINFORCED BATTERY PACK AND PROCESS FOR ASSEMBLING SAID BATTERY PACK

The present invention relates to protection and reinforcement elements in the car industry, and more specifically relates to the protection of a battery pack of an electric or hybrid vehicle.

BACKGROUND

Electrical vehicles or hybrid vehicles have to embed at least one heavy and bulky battery pack. This battery pack is made of a plurality of battery cells, that must be very well protected both against physical intrusion that may occur during a car accident and against mechanical shock while the battery pack is moved during assembly to the considered vehicle.

SUMMARY OF THE INVENTION

It is known from U.S. Pat. No. 8,967,312 to design a battery pack comprising a plurality of cells inserted in a tray, or tub, comprising a plate bottom and a wall which is upward bent from the peripheral edge of the bottom. The wall is reinforced with an inner frame and an outer frame for better cells protection. However, the clearance angle of the tray forms a lost zone which is a problem in the optimization of the space when inserting the battery cells in the tray.

Moreover, the battery pack structure of the prior art is not used to improve the overall performance of the vehicle in terms of crash management. It is only designed to host and protect the battery cells, without a view to bringing further improvements to the vehicle.

It is known from DE102016115037A1 to form the inner and outer frame structures using four different elements which are welded together after having been formed into three-dimensional parts.

It is an object of the present invention to provide a way to efficiently protect battery cells of the battery pack while optimizing battery cells arrangement of said pack and contributing to an overall improvement of the vehicle crash management.

As will be seen through the following figures and description, the present invention offers further advantages in terms of product design flexibility and also in terms of flexibility of the assembly sequence.

For this purpose, a first subject of the present invention consists of a reinforcement frame for a battery pack of an electric or hybrid vehicle, said battery pack comprising a plurality of battery cells lying on and secured to a shield element, said reinforcement frame comprising at least:
  a reinforcement frame fastening portion provided to be secured to both the battery pack and the body of the vehicle, and
  a reinforcement frame hollow portion provided to surround at least the battery cells.

The reinforcement frame according to the invention may also have the optional features listed below, considered individually or in combination:
  The reinforcement frame comprises an inner part and an outer part both having a fastening section and a reinforcement section, wherein the fastening sections are secured to each other in order to form the reinforcement frame fastening portion and wherein the reinforcement sections delimits the reinforcement frame hollow portion.
  The reinforcement sections of the inner and outer parts are both L-shaped and arranged symmetrically with respect to a Y-axis of the reinforcement frame hollow portion then forming a square or rectangular reinforcement frame hollow portion.
  The reinforcement frame comprises a covering frame extending from the reinforcement frame hollow portion, said covering frame being provided to be secured to a top cover of the battery cells.
  The inner and outer parts both have a covering portion extending from the considered reinforcement section, said covering portions being secured to each other in order to form the covering frame.
  The inner and outer parts are made of press hardenable steel.
  The inner and outer parts are made of laser welded blanks.
  For any given cross section of the reinforcement frame, the product of the minimum tensile strength by the sheet thickness of the inner part is equal to or higher than the product of the minimum tensile strength by the sheet thickness of the outer part.
  The reinforcement frame has a general square or rectangular shape, and having corners are chamfered corners.
  The reinforcement frame comprises at least a longitudinal reinforcement member which is located inside the reinforcement frame hollow portion and secured to said reinforcement frame hollow portion.
  The longitudinal reinforcement member has an omega-shaped cross-section.

A second subject of the invention consists of a reinforced battery pack for an electric or hybrid vehicle comprising a plurality of battery cells and a reinforcement frame, and further comprising the optional features listed below considered individually or in combination:
  a lower protective element named shield element provided to avoid intrusion into the battery pack,
  cooling means lying on the shield element provided to cool down the battery cells,
  a mesh lying on the cooling means and comprising a plurality of housing crossmembers forming a plurality of housing members, each battery cell being housed in a considered housing member,
  the reinforcement frame described above, having a reinforcement frame fastening portion secured to the shield element and a reinforcement frame hollow portion surrounding at least the battery cells, and
  a top cover secured to the reinforcement frame.

The reinforced battery pack according to the invention may also have the optional features listed below, considered individually or in combination:
  The covering member is secured to the top cover frame of the reinforcement frame.
  The reinforced battery pack comprises regularly spaced anti-intrusion crossmembers located between the shield element and the cooling means.
  The shield element is made of steel having a tensile strength greater than 1300 MPa.

A third subject of the invention consists of a process for assembling a reinforced battery pack according to the invention and attaching it to the body of an electric or hybrid vehicle, said body comprising a floor, at least a pair of rear members and a pair of front members, said pairs being opposite to each other and being provided to absorb rear and frontal shocks, and two side sills opposite to each other secured to the floor and provided to absorb lateral shocks, the process comprising at least the steps of:
  providing battery cells
  providing an inner and outer part
  positioning the inner part around the battery cells
  attaching the fastening section of the outer part to the pair of side sills in such a way that the corners of the outer part located towards the front of the vehicle are adjacent to the rear end of the front members and the corners of the outer part located towards the rear of the vehicle are adjacent to the front end of the rear members
  attaching the fastening section of the inner part to the fastening section of the outer part so as to form a reinforcement frame having a fastening portion attached to the body of the hybrid or electric vehicle and a hollow portion surrounding the battery cells.

A fourth subject of the invention consists of a process for assembling a reinforced battery pack according to the invention and attaching it to the body of an electric or hybrid vehicle, said body comprising a floor, at least a pair of rear members and a pair of front members, said pairs being opposite to each other and being provided to absorb rear and frontal shocks, and two side sills opposite to each other secured to the floor and provided to absorb lateral shocks, the process comprising at least the steps of:
  providing battery cells
  providing an inner and outer part
  attaching the fastening sections of the inner and outer parts to one another so as to form a reinforcement frame having a fastening portion and a hollow portion
  positioning the reinforcement frame around the battery cells
  attaching the fastening portion to the pair of side sills in such a way that the corners of the reinforcement frame located towards the front of the vehicle are adjacent to the rear end of the front members and the corners of the reinforcement frame located towards the rear of the vehicle are adjacent to the front end of the rear members.

BRIEF DESCRIPTION OF THE DRAWINGS

Other characteristics and advantages of the invention will be described in greater detail in the following description.

The invention will be better understood by reading the following description, which is provided purely for purposes of explanation and is in no way intended to be restrictive, with reference to.

DETAILED DESCRIPTION

It should be noted that the terms "lower", "upper", "above", "below", "lowest", "highest", "top", "bottom", "left", "right" as used in this application refer to the positions and orientations of the different parts of the reinforcement frame, of the battery pack and of the vehicle when they are positioned vertically on the ground. Furthermore, the terms "front", "forward", "rear", "back", "backwards" are defined according to the normal driving direction of a vehicle. The terms "substantially perpendicular" define an angle of 90°+/−15° and the terms "substantially parallel" define an angle of 0°+/−15°.

A first subject object of the present invention is the reinforcement frame 1, which will now be described with the support of FIGS. 1 to 6.

Figure 1:
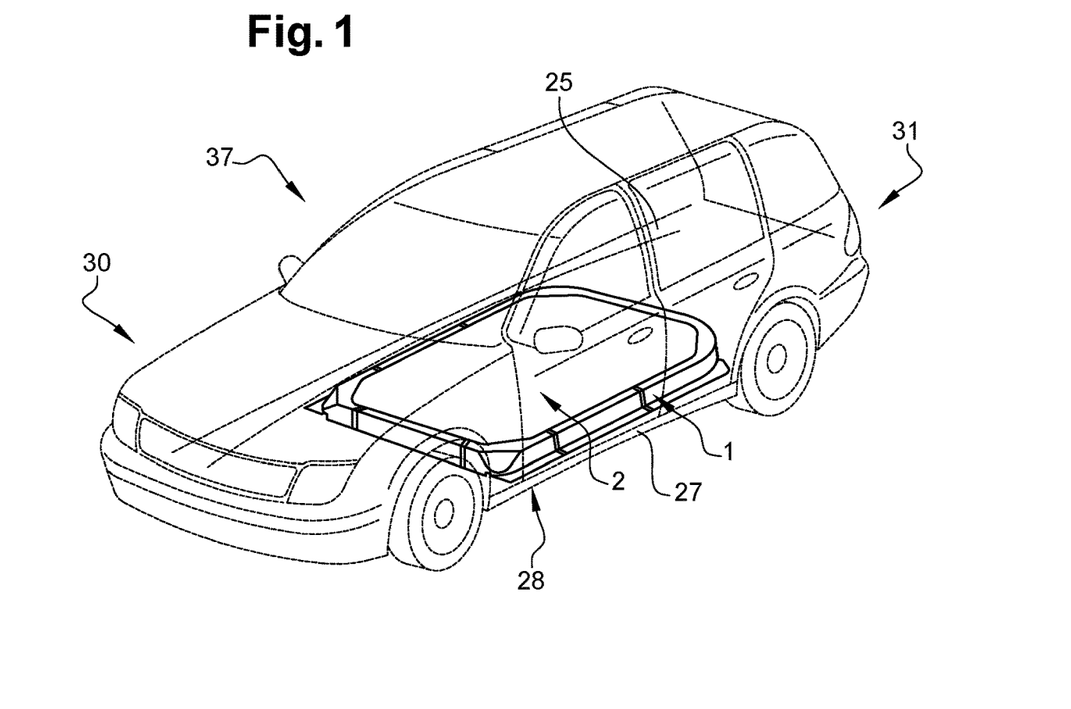
FIG. 1, which is a perspective view of a body of a vehicle comprising a reinforced battery pack according to the invention.

This reinforcement frame 1 is designed to protect battery cells 29 (see, e.g., FIG. 2) of a battery pack of a hybrid or electric vehicle 37 from mechanical shocks and physical intrusions. The reinforcement frame 1 is thus provided to be secured both to the battery pack and to the body 30, 31 of the vehicle 37, as depicted in FIG. 1. While protecting the battery cells 29, the reinforcement frame 1 also provides active crash energy management.

The battery pack is a well-known component of electric and hybrid vehicles, and essentially comprises a plurality of cells 29.

Figure 7:
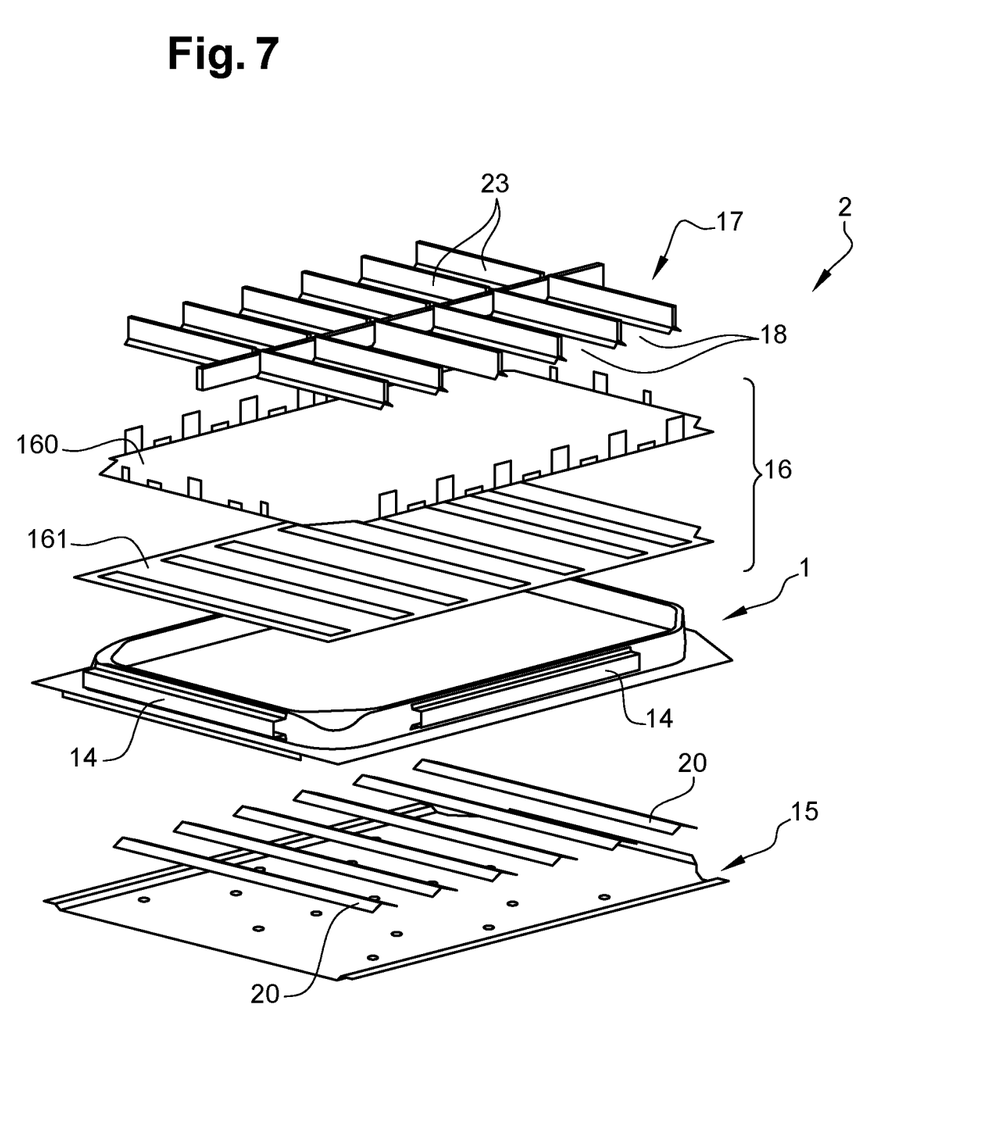
FIG. 7, which is an exploded view of a part of a specific embodiment of the reinforced battery pack of the invention.

In a particular embodiment, the battery cells 29 lie on a shield element 15 (see, e.g., FIG. 7). This shield element 15 is for example made of fully martensitic steel comprising between 0.15% and 0.5% of carbon in weight. This martensitic steel has a tensile strength greater than 1800 MPa, making the shield element 15 particularly resistant against physical intrusion coming from the bottom.

The reinforcement frame 1 of the invention is made of steel and comprises a reinforcement frame fastening portion 3 (see, e.g., FIG. 3) which is provided to secure the battery pack to the body 30, 31 of the vehicle 37, and a reinforcement frame hollow portion 4 (see, e.g., FIG. 3) secured to the reinforcement frame fastening portion 3 and provided to surround at least the battery cells 29.

According to the invention, the reinforcement frame 1 is made of two ring-shaped elements 10, 11 (see, e.g., FIG. 4) secured to each other. These two elements are further called the inner part 10 and the outer part 11 of the reinforcement frame 1. The inner part 10 is provided to surround at least the battery cells 29, while the outer part 11 is provided to be in contact with a part of the body 30, 31 of the vehicle 37.

Figure 3:
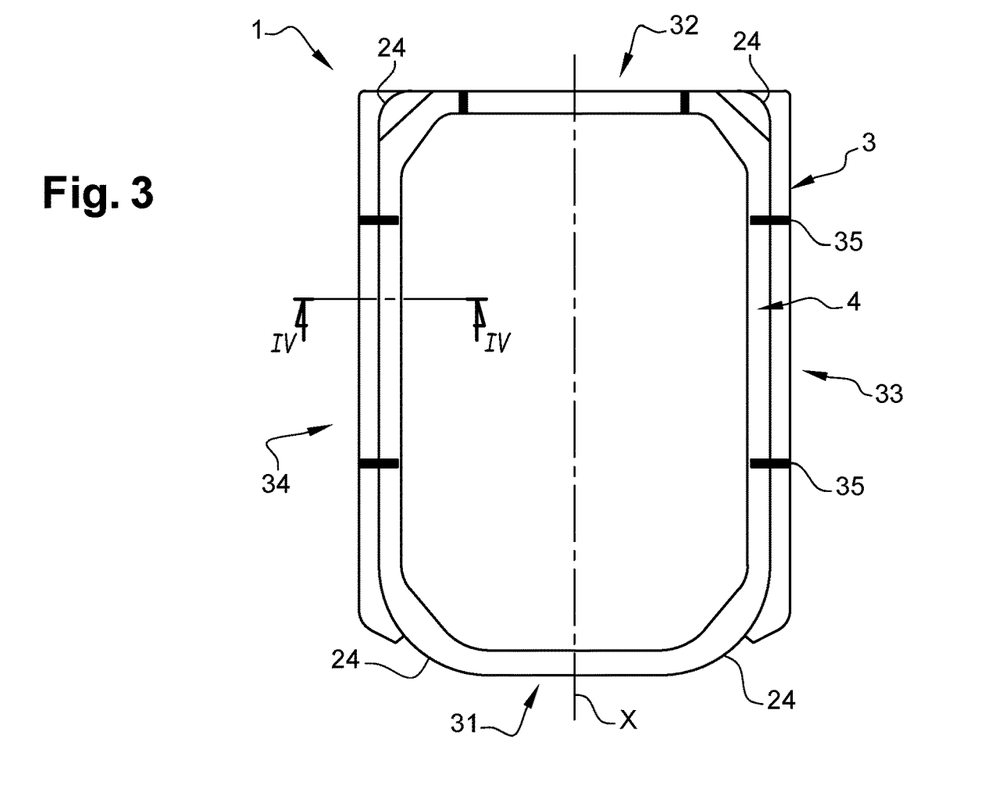
FIG. 3, which is a top view of the reinforcement frame according to the invention.

As depicted in FIG. 3, the reinforcement frame has a substantially rectangular shape extending along a longitudinal axis X, with two longitudinal sections 33, 34, two transverse sections 31, 32 and four corners 24.

Each part 10, 11 of the reinforcement frame 1 is manufactured by stamping a steel blank. In a particular embodiment, the stamping operation is a hot stamping operation in which the blank is heated and subsequently quenched in the stamping tool. It is thus possible to obtain the complex shapes needed for the part while ensuring very high mechanical properties to have very good resistance in case of shock.

In a particular embodiment, each part 10, 11 of the reinforcement frame 1 is manufactured by stamping a tailor welded blank, comprising several sub-blanks. Said sub-blanks can have different thicknesses and/or different compositions, in order to optimize the mechanical performance and the weight of the part. In areas where higher mechanical resistance is needed to provide adequate protection in case of shock a higher thickness and/or a more resistant steel grade will be used. On the other hand, in areas where the mechanical resistance can be lower, a lower thickness can be used in order to reduce the weight of the part. An example of such a tailor welded blank design is depicted in FIGS. 2, 3, 5 and 6 where welding lines 35 are made apparent. In this embodiment, both inner and outer parts 10, 11 are made of six sub-blanks or pieces joined together using butt laser welding to form two blanks: one piece for each longitudinal member 33, 34, one piece for two corners 24 and a transverse member 32, and three pieces for the remaining corners 24 and the remaining transverse member 31. Such a laser welded blank conception is very flexible and allows for multiple variants in order to meet the safety, regulatory and optimized weight requirements imposed to the battery pack. In the present example, a laser welded blank having six sub-blanks was presented. However, one can choose as little or as many blanks as necessary taking into account the engineering and cost constraints of the particular battery pack to be designed.

In a particular embodiment, the laser welded blank used to manufacture the inner and outer parts 10, 11 will have higher thicknesses on the portions of the reinforcement frame 1 which are located parallel to the side of the vehicle 37 and on the portions which correspond to the corners of the reinforcement frame 1. Indeed, in case of a lateral impact to the vehicle 37, such as for example a pole impact to the side of the vehicle 37, the portions of the reinforcement frame 1 which are located parallel to the side of the vehicle 37 will be submitted to very high local loads, and therefore need to be reinforced. Also, in the case of frontal or rear crash, the load coming from the impact will be transmitted to the rest of the reinforcement frame 1 through the corner portions, as will be detailed below. The corner portions therefore also need to be reinforced.

Figure 8:
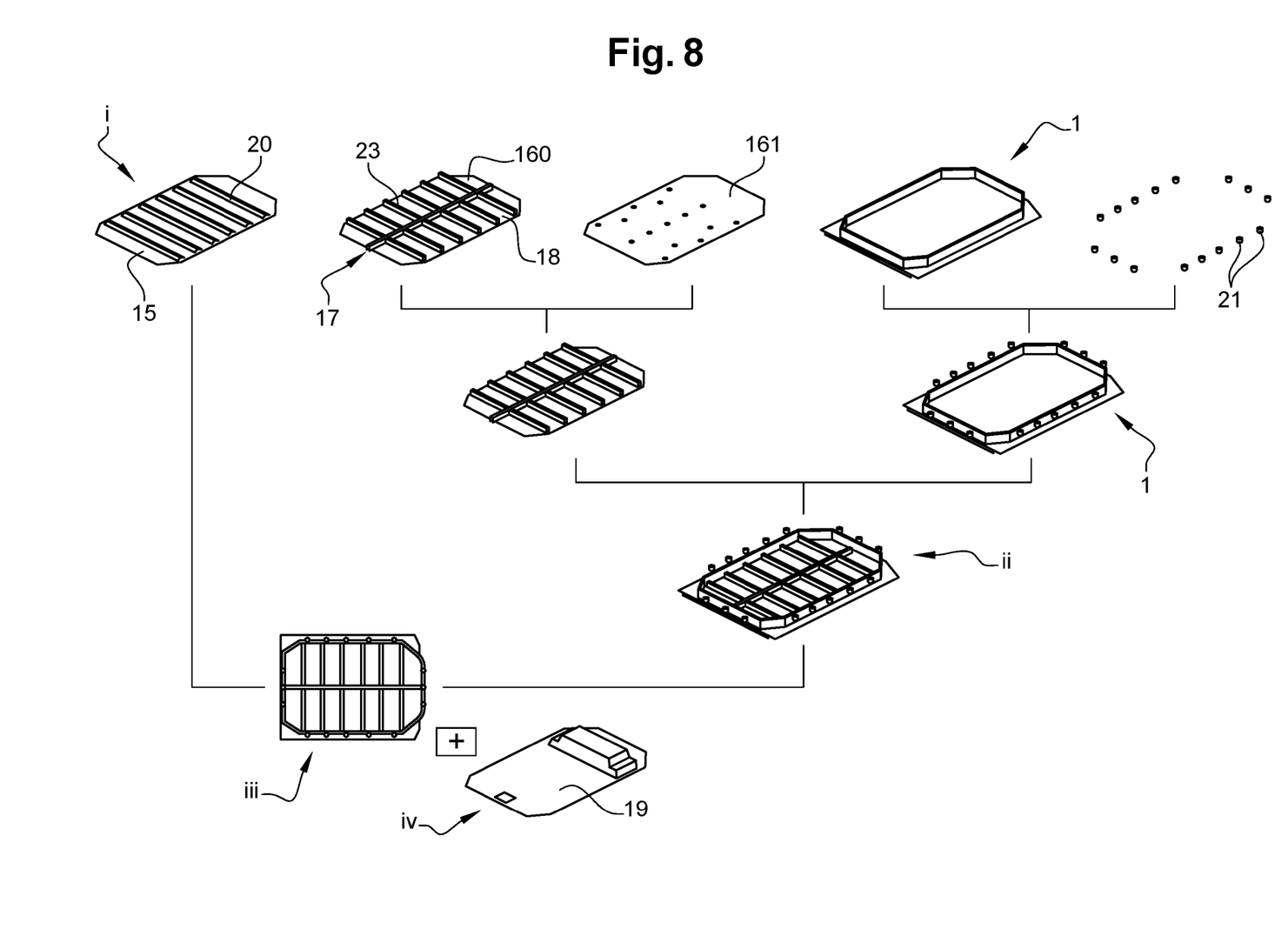
FIG. 8, which represents a process of assembling a specific embodiment of the reinforced battery pack of the invention.

The inner and outer parts 10, 11 are assembled together. Both inner and outer parts 10, 11 have fastening sections 5, 6 that are secured to each other with securing means 21, as depicted in FIG. 8, in order to form the reinforcement frame fastening portion 3 of the reinforcement frame 1. Preferably, the two fastening sections 5, 6 are in contact. In addition, both inner and outer parts 10, 11 have reinforcement sections 7, 8 forming the reinforcement frame hollow portion 4 of the reinforcement frame 1.

As a preferred example, the fastening sections 5, 6 of the outer and inner parts 10, 11 are bolted together.

Figure 4:
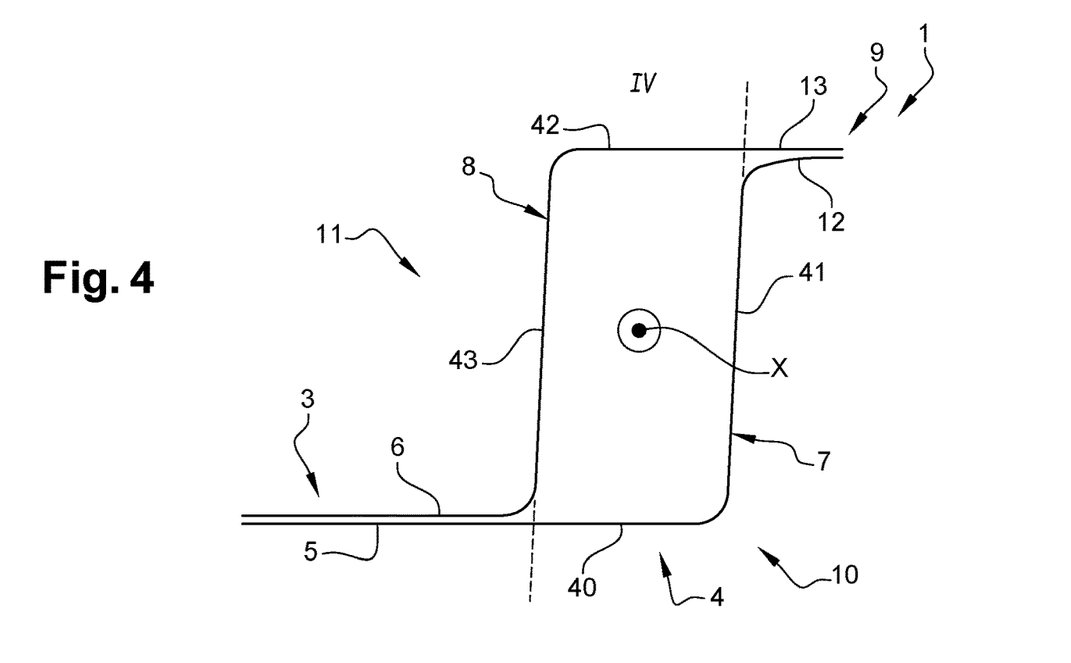
FIG. 4, which is a cross section view of FIG. 3 following arrow IV.
Figure 5:
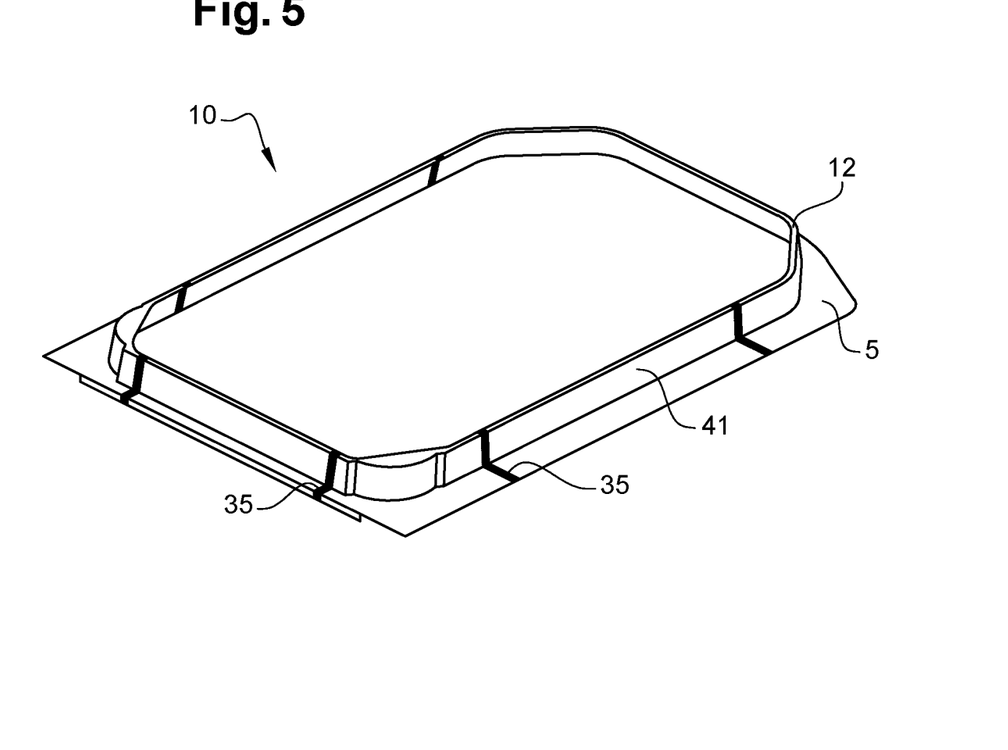
FIG. 5, which is a perspective view of the reinforcement frame inner of FIG. 3.

As depicted in FIG. 4 and according to the invention, an example of geometry of each reinforcement section will now be described.

The reinforcement sections 7, 8 of the inner and outer parts 10, 11 are both substantially L-shaped and positioned in symmetrical positions with respect to an axis Y of the reinforcement frame hollow portion 4. More specifically, when looking at FIG. 4, the reinforcement section 7 of the inner part 10 has a L-shape, whereas the reinforcement section 8 of the outer part 11 has an inverted L-shape. It should be noted that while the reinforcement sections 7 and 8 substantially extend along an L-shape, it is possible to introduce some modifications compared to a perfect L-shape, such as notches or others, to take into account for example the packaging constraints induced by the environing elements of the vehicle 37. It should be also noted that the inner and outer parts 10, 11 can have slightly different shapes so they are not fully positioned in symmetrical positions, provided said inner and outer parts 10, 11 define the reinforcement frame hollow portion 4.

The reinforcement frame hollow portion 4 thus has a substantially square or rectangular cross section. The reinforcement frame hollow portion 4 thus has four main walls: a bottom wall 40 from which the fastening section 5 of the inner part 10 extends and an opposite upper wall 42, an inside wall 41 facing the battery cells 29 and an opposite outer wall 43 from which the fastening section 6 of the outer part 11 protrudes. In addition, the reinforcement frame 1 has a substantially square or rectangular shape.

Thus, the bottom wall 40 continues with the fastening section 5 of the inner part 10 extending from the bottom wall 40 in a parallel manner and the outer wall 43 is substantially perpendicular to the fastening section 6 of the outer part 11.

In the case of an impact to the vehicle, the reinforcement frame 1 is designed to absorb part of the energy of the impact through the deformation of its outer part 11 while protecting the battery cells 29 thanks to the anti-intrusion behavior of the inner part 10. Because the reinforcement frame 1 is located in the middle of the vehicle, it is expected to play an active role in crash management in the case of a front impact, a rear impact or a lateral impact. The outer part 11 is designed to be able to sustain some amount of deformation in the case of a crash while the inner part 10 defines a "no-go" zone inside which the battery cells 29 are fully protected from intrusion in the case of an impact.

One way to apply this double concept of energy absorption through the outer part 11 and anti-intrusion through the inner part 10 is to provide parts wherein for any given cross section the product of the minimum tensile strength by the sheet thickness of the inner part 10 is equal to or higher than the product of the minimum tensile strength by the sheet thickness of the outer part 11.

As an example, both inner and outer frame 10, 11 is made of press-hardening steel having a tensile strength greater than 1300 MPa. The composition of this steel is for example in weight percentage:

| | |
|---|---|
| Carbon | Between 0.20 and 0.25% |
| Manganese | Between 1.1 and 1.4% |
| Silicon | Between 0.15 and 0.35% |
| Chromium | Less than 0.30 % |
| Titanium | Between 0.02 and 0.06% |
| Aluminum | Between 0.02 and 0.06% |
| Sulfur | Less than 0.005% |
| Phosphorus | Less than 0.025% |
| Boron | Between 0.002 and 0.004% |
| Iron and inevitable impurities coming from the steelmaking process | Remaining |

In this embodiment, the thickness of the inner part is for example comprised between 1.2 and 1.6 mm.

In another embodiment, both inner and outer part 10, 11 can be made with a harder steel having a tensile strength greater than 1800 MPa. The composition of this steel is for example in weight percentage:

| | |
|---|---|
| Carbon | Between 0.24 and 0.38% |
| Manganese | Between 0.40 and 3% |
| Silicon | Between 0.10 and 0.70% |
| Aluminum | Between 0.015 and 0.07% |
| Chromium | Less than 2% |
| Nickel | Between 0.25 and 2% |
| Titanium | Between 0.015 and 0.1% |
| Niobium | Less than 0.06% |
| Boron | Between 0.0005 and 0.004% |
| Nitrogen | Between 0.003 and 0.01% |
| Sulfur | Less than 0.005% |
| Phosphorus | Less than 0.025% |
| Iron and inevitable impurities coming from the steelmaking process | Remaining |

In this embodiment, the thickness of the inner and outer part 10, 11 are for example comprised between 1 and 1.4 mm, and the part can have a lower weight while keeping the same mechanical resistance as a part made with the lower strength steel described in the previous embodiment.

These two examples of steel alloys have a great rigidity, so that the inner part 10 of the reinforcement frame 1 offers a good protection against any deformation or against any physical intrusion through the battery cells 29.

According to the invention, the outer part 11 is made of a material that has same or greater ductility than the material of the inner part 10. As an example, the outer part 11 can be made with a steel having a tensile strength around 1000 MPa. The composition of this steel is for example in weight percentage:

| | |
|---|---|
| Carbon | Between 0.20 and 0.25% |
| Manganese | Between 1.1 and 1.4% |
| Silicon | Between 0.15 and 0.35% |
| Chromium | Less than 0.30% |
| Titanium | Between 0.02 and 0.06% |
| Aluminum | Between 0.02 and 0.06% |
| Sulfur | Less than 0.005% |
| Phosphorus | Less than 0.025% |
| Boron | Between 0.002 and 0.004% |
| Iron and inevitable impurities coming from the steelmaking process | Remaining |

Since the ductility of the outer part 11 is greater than that of the inner part 10, the outer part 11 may be deformed by any mechanical shock. The deformations that occur in this case result in a mechanical energy absorption, reducing the remaining energy absorbed by the walls 40, 41 of the inner part. As a result, the risk of deformation or deterioration of the inner part 10 is significantly reduced.

Figure 6:
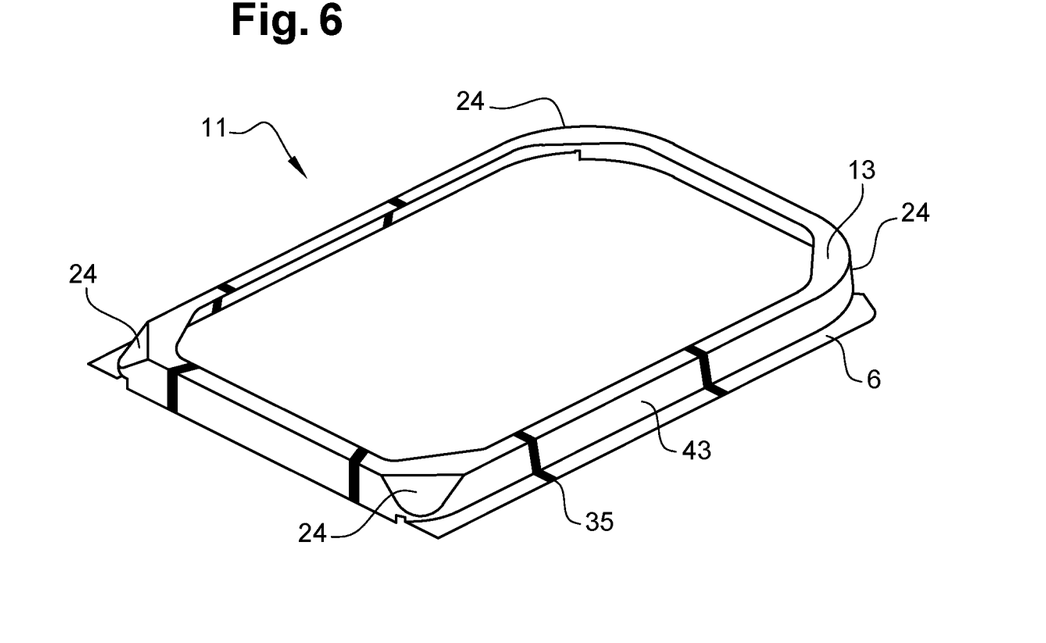
FIG. 6, which is a perspective view of the reinforcement frame outer of FIG. 3.

Preferentially, the corners 24 of the reinforcement frame, and more specifically the corners of the outer part 10 of the reinforcement frame 1, are chamfered as depicted in FIG. 6. This reduces thinning of the material in the corners 24, resulting in better resistance of the reinforcement frame 1 and better energy transmission through the longitudinal 33, 34 and transverse members 31, 32.

According to a particular embodiment as depicted in FIG. 4, the reinforcement frame 1 comprises a covering portion 9 protruding from the reinforcement frame hollow portion 4. Thanks to this covering portion 9, the top plate 19 (FIG. 8) provided to seal the top of the battery pack and to protect the battery cells 29 can be secured to the covering portion 9 of the reinforcement frame 1.

In order to form said covering portion 9, both inner and outer parts 10, 11 have a covering section 12, 13 extending from the considered reinforcement section 7, 8. The two covering sections 12, 13 are secured to each other to form the covering portion 9. Preferentially, the two covering section 12, 13 are in contact.

Finally, in order to strengthen the reinforcement frame 1, several reinforcement members 14 (FIG. 7) can be inserted inside the hollow body 4, preferably one reinforcement member 14 for each longitudinal and transverse member 31-34 and also in the corners if required. Each reinforcement member 14 has preferably an omega shape to offer both good energy absorption and good securing. reinforcement members 14 are preferably secured to the inner wall 41 of the reinforcement frame hollow portion 4.

A second subject of the present invention is a reinforced battery pack 2 which comprises the above described reinforcement frame 1 surrounding the battery cells 29.

Figure 2:
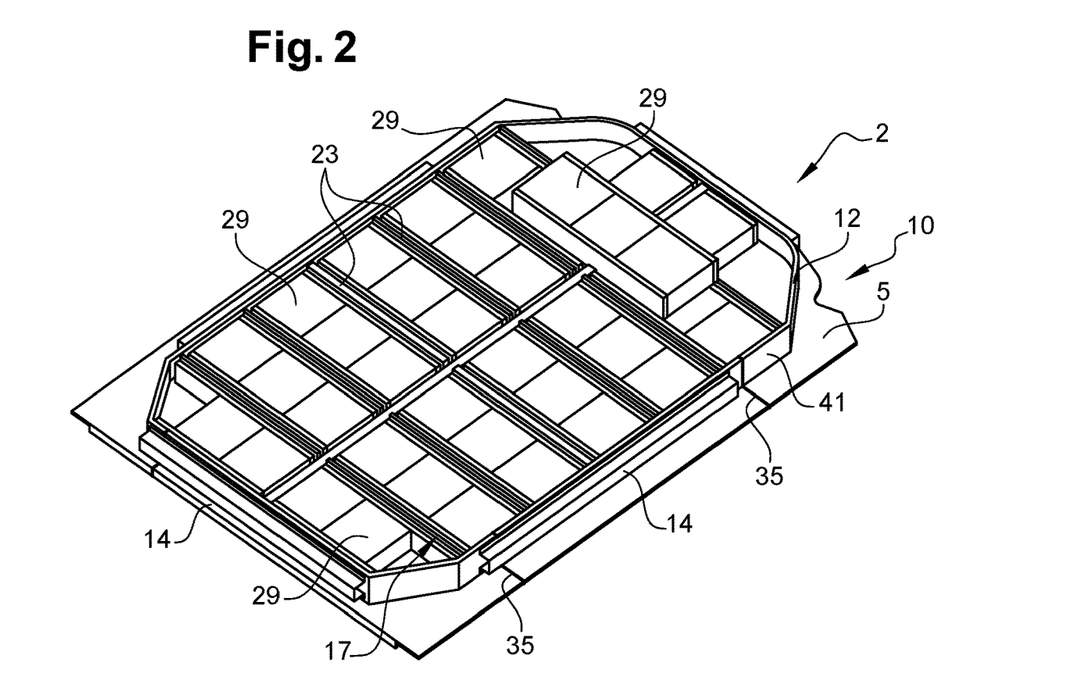
FIG. 2, which is a perspective view of a part of the reinforced battery pack which includes the reinforcement frame inner.

A part of a specific embodiment of the reinforced battery pack 2 is depicted in perspective view in FIG. 2 and as an exploded view in FIG. 7. It should also be noted that battery cells 29 are depicted in FIG. 2 but not in FIG. 7.

Figure 9:
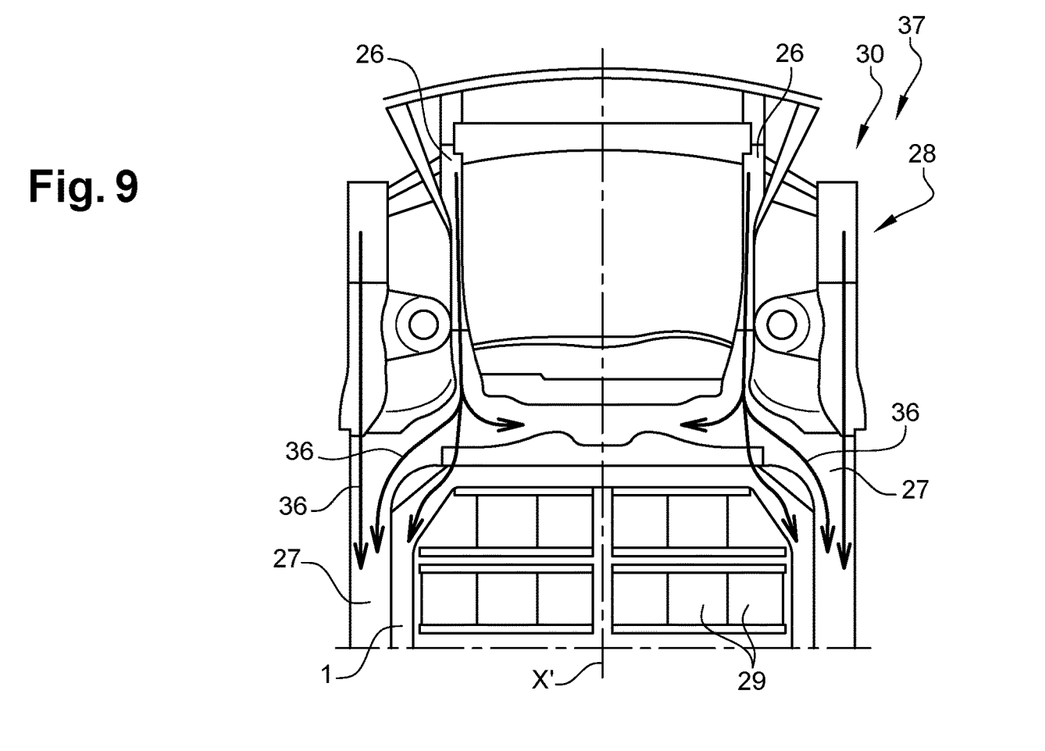
FIG. 9, which is the bottom view of the front part of the body of a vehicle.
Figure 10:
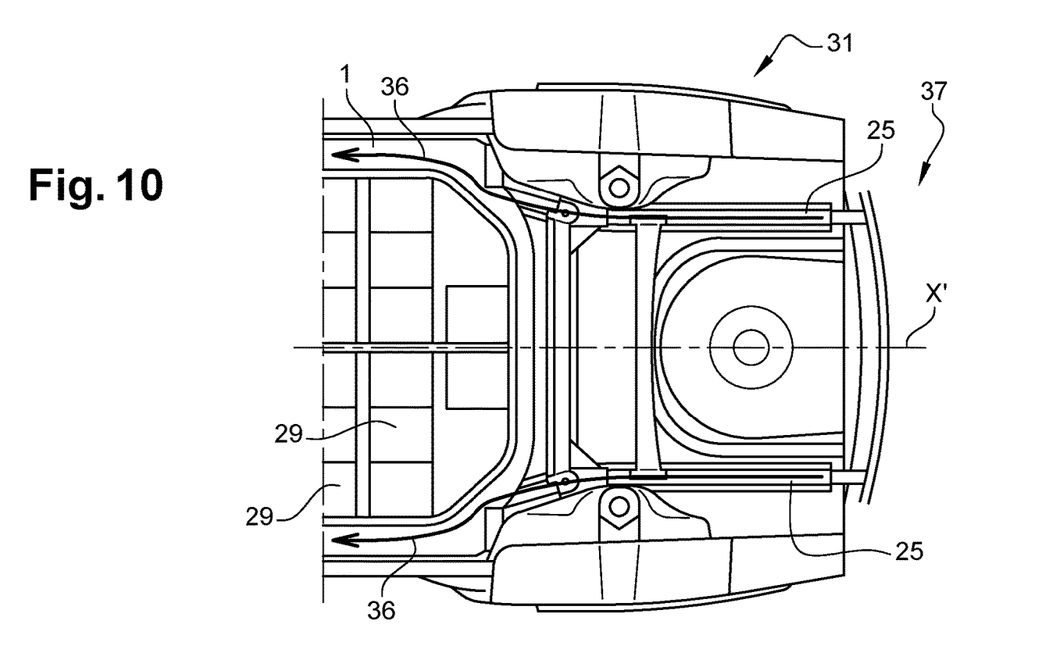
FIG. 10, which is the bottom view of the rear part of the body of the vehicle of FIG. 9.

The reinforced battery pack 2 comprises the reinforcement frame 1 and the battery cells 29 along with other elements listed below, which can optionally be included in the make-up of the reinforced battery pack 2, taken alone or in any possible combinations of each other. It should be noted that the following list is in no way meant to be comprehensive or limiting the scope of the invention, but is rather given as means of examples to illustrate possible applications of the current invention:

- the shield element 15 described above;
- cooling means 16 lying on the shield element 15 and provided to cool down the battery cells 29. As an example, the cooling means 16 comprises two thermal conducting elements named cladding elements secured to each other and a cooling system (not represented) inserted between the two cladding elements 160, 161;
- regularly spaced anti-intrusion crossmembers 20 secured to the shield element 15 and located between said shield element 15 and the cooling means 16;
- a mesh 17 comprising a plurality of housing crossmembers 23 lying on the cooling means 16. The housing crossmembers 23 forms a plurality of regularly dispatched housing members 18.
- Preferably, the transverse housing cross members 23 are aligned with the anti-intrusion crossmembers 20, so that in case of an intrusion coming from the bottom of the vehicle 37, said anti-intrusion crossmembers 20 and transverse housing cross members 23 collaborate together to provide optimal resistance.
- a plurality of battery cells 29 (FIGS. 2, 9 and 10). Each battery cell 29 is housed in the considered housing member 18 and is in contact with the cooling means 16.

According to the invention, the battery pack is reinforced with the reinforcement frame 1 of the invention to form a reinforced battery pack 2. The reinforcement frame fastening portion 3 of the reinforcement frame 1 is for example secured to the shield element 15. The reinforcement frame hollow portion 4 surrounds the battery cells 29, the mesh 17 and the cooling means 16. Only the inner part 10 of the reinforcement frame is depicted in FIGS. 2 and 7.

Finally, the reinforced battery back 2 optionally comprises a top plate also named top cover 19 (FIG. 8) that is secured to the reinforcement frame 1. For example, the top plate 19 is bolted to the covering frame 9 of the reinforcement frame 1. Advantageously, by bolting the top plate 19 to the covering frame 9, it is possible to remove it in case maintenance of the battery cells 29 or other elements is necessary.

According to a particular embodiment, a process for assembling the reinforced battery pack 2 depicted in FIG. 8 will now be described.

In a first step i, a first assembly is provided by securing the anti-intrusion crossmembers 20 to the shield element 15.

In a second step ii, a second assembly is provided following the sub-steps of:
  assembling the cladding elements 160, 161 and the cooling system to form the cooling means 16;
  securing the mesh 17 to the cooling means 16;
  providing the battery cells 29 inside the housings 18 of the mesh 17;
  positioning the reinforcement frame 1 around the cooling means 16, the mesh 17 and the battery cells 29.

In a third step iii, the reinforcement frame fastening portion 3 of the reinforcement frame 1 is bolted to the shield element 15 with securing means 21. Preferentially, the inner part 10 and the outer part 11 of the reinforcement frame 1 and the shield element 15 are bolted together in the same step using said securing means 21.

In a particular embodiment, the securing means 21 are Self Pierce and Clinch nuts, such as the SPAC® nuts commercialized by RB&W.

In a fourth and final step iv, the top plate 19 is secured to the reinforcement frame 1. Advantageously, the top plate 19 is bolted to the covering frame 9 of the reinforcement frame 1.

The reinforced battery pack 2 is then protected against any physical shock and against any physical intrusion and can be securely moved during any further assembling process of the reinforced battery pack 2.

According to another process of the invention, the reinforced battery pack 2 may be assembled to the body 30, 31 of the vehicle 37.

In a first step, the reinforcement battery pack 2 is positioned in the body 30, 31 of the vehicle 37 so that the longitudinal axis X of the reinforcement frame 1 is parallel to the longitudinal axis X' of the vehicle. Once positioned, the corners 24 of the reinforcement frame 1 are respectively in contact with an extremity of the rear members 25 and with an extremity of the front members 26.

In a second and last step, the reinforcement frame 1 of the reinforced battery pack 2 is secured to the side sills 27 of the body 30, 31 of the vehicle 37.

Thanks to this configuration, the energy of any longitudinal shock against the vehicle 37 will be transmitted through the corresponding members 25, 26 and will be transmitted via the corners 24 through the longitudinal and transverse members 31-34 of the reinforcement frame 1, avoiding any deformation or deterioration of the reinforced battery pack 2. Similarly, any lateral shocks against the side sills 27 of the body of the vehicle 37 will be transmitted through the longitudinal members 33, 34 of the reinforcement frame 1.

The reinforcement frame 1 of the invention is of great interest to protect battery packs of any electric or hybrid vehicle.

The embodiments described hereinabove are entirely non-limiting and amendments can be made thereto without departing from the scope of the invention. By way of example, both inner and outer parts may be manufactured with the same high tensile strength steel, like Usibore®1500 or Usibore®2000. Finally, the reinforced battery pack 2 may only comprise the inner part 10 of the reinforcement frame 1, while the outer part 11 of the reinforcement frame 1 is secured to the body 30, 31 of the vehicle 37. In this case, the assembling of the reinforced battery pack 2 to the vehicle is implemented by bolting the fastening section 5 of the inner part 10 to the fastening section 6 of the outer part 11.

Third and fourth subjects of the current invention are assembly processes of the reinforced battery pack 2 attached to the vehicle 37.

The body of the vehicle 37, also known as "body in white" refers to car body's components that have been joined together, using one or a combination of different techniques: welding, riveting, clinching, bonding, laser brazing . . . .

According to FIGS. 1, 9 and 10, the body 30, 31 of the vehicle 37 extends regarding a longitudinal axis X' and comprises a floor 28, at least a pair of rear members 25 and a pair of front members 26. The front members 26 are in the front of the vehicle 37 and the rear members 25 are located towards the rear of the vehicle. The two pairs of members 25, 26 are thus opposite to each other and provided to absorb shocks coming from the front and from the rear. In addition, the body 30, 31 of the vehicle 37 comprises two side sills 27, secured to the floor 28 and positioned opposite to each other. Those side sills 27 are provided to absorb lateral shocks.

The above described reinforcement frame 1 can be integrated in the overall vehicle architecture in several different ways, following two main assembly possibilities:

According to a first possibility, the outer part 11 is attached to the body 30, 31, while the inner part 10 is positioned around the battery cells 29. The inner part 10 is then attached to the outer part 11 in order to secure the battery pack 2 to the vehicle.

According to a second possibility, the inner and outer parts 10, 11 are first fastened together to form the reinforcement frame 1 and then positioned around the battery cells 29. The thus assembled battery pack 2 is then attached to the body in white by attaching the reinforcement frame 1 to the body in white. In this second configuration, it can be considered that the full reinforcement frame 1 belongs to the battery pack 2.

Turning to the first possibility, the assembly sequence comprises the following steps:
  providing the battery cells 29
  providing the inner and outer part 10 and 11
  positioning the inner part 10 around the battery cells 29. For example, the battery cells 29 are laid upon the shield element 15 and the fastening portion 5 of the inner part 10 is fastened to the shield element 15.
  attaching the fastening section 6 of the outer part 11 to the pair of side sills 27 in such a way that the corners of the outer part 10 located towards the front of the vehicle 37 are adjacent to the rear end of the front members 26 and the corners of the outer part 10 located towards the rear of the vehicle are adjacent to the front end of the rear members 25
  attaching the fastening section 5 of the inner part 10 to the fastening section 6 of the outer part 11 so as to form a reinforcement frame 1 having a fastening portion 3 attached to the body of the hybrid or electric vehicle 37 and a hollow portion 4 surrounding the battery cells 29.

Turning to the second possibility, the assembly sequence comprises the following steps:
  providing the battery cells 29
  providing an inner and outer part 10 and 11
  attaching the fastening sections 5 and 6 of the inner and outer parts 10 and 11 to one another so as to form the reinforcement frame 1 having a fastening portion 3 and a hollow portion 4 positioning the reinforcement frame 1 around the battery cells 29. For example, the battery cells 29 are laid upon the shield element 15 and the fastening portion 5 of the inner part 10 is fastened to the shield element 15.

attaching the fastening portion 3 to the pair of side sills 27 in such a way that the corners of the reinforcement frame 1 located towards the front of the vehicle 37 are adjacent to the rear end of the front members 26 and the corners of the reinforcement frame 1 located towards the rear of the vehicle are adjacent to the front end of the rear members 25.

Thanks to this configuration of the reinforcement frame 1 inside the vehicle, the energy of a frontal or rear collision against the vehicle 37 will be transmitted through the corresponding members 25, 26 and will be transmitted via the corners 24 through the longitudinal and transverse members 31-34 of the reinforcement frame 1, avoiding any deformation of the inner part 10 of the reinforcement frame 1. Furthermore, the reinforcement frame 1 serves to deflect and distribute the impact energy in case of a frontal or rear collision. Indeed through its high strength and central position with the vehicle architecture, the reinforcement frame 1 is placed on the path of the load transmitted by the impact, as materialized by the arrows 36 on FIGS. 9 and 10, which show the path that the impact force will take. The load will first be transmitted to the vehicle structure through the members 25 or 26 respectively in the case of a rear or frontal crash. The load will then be picked up by the rest of the vehicle structure and in particular by the reinforcement frame 1. The load will be deflected from the center path of the vehicle 37, wherein lays the sensitive battery cells 29, to the sides of the vehicle 37, through the reinforcement frame 1.

What is claimed is:

1. A reinforcement frame for a battery pack of an electric or hybrid vehicle mounted on the vehicle, the battery pack having a plurality of battery cells, the reinforcement frame comprising:
    a reinforcement frame fastening portion provided to be secured to both the battery pack and the body of the vehicle;
    a reinforcement frame hollow portion provided to surround at least the battery cells; and
    an inner stamped part and an outer stamped part both having a fastening section and a reinforcement section, wherein the fastening sections are secured directly to each other in order to form the reinforcement frame fastening portion and wherein the reinforcement sections delimit the reinforcement frame hollow portion;
    the inner and outer stamped parts each being made of press hardenable steel laser welded stamped blanks, said laser welded stamped blanks each including several sub-blanks.

2. The reinforcement frame as recited in claim 1 wherein the reinforcement sections of the inner and outer parts are both substantially L-shaped and arranged in symmetrical positions with respect to an axis Y of the reinforcement frame hollow portion then forming a substantially square or rectangular reinforcement frame hollow portion.

3. The reinforcement frame as recited in claim 1 further comprising a cover portion extending from the reinforcement frame hollow portion, the cover portion being provided to be secured to a top cover of the battery pack.

4. The reinforcement frame as recited in claim 3 wherein the inner and outer parts both have a respective cover portion extending from the respective reinforcement section, the respective cover portions being secured to each other in order to form the cover portion.

5. The reinforcement frame as recited in claim 1 wherein for any given cross section of the reinforcement frame, a product of a minimum tensile strength by a thickness of the inner part is equal to or higher than a further product of a minimum tensile strength by a thickness of the outer part.

6. The reinforcement frame as recited in claim 1 wherein the reinforcement frame has a substantially square or rectangular shape and has chamfered corners.

7. The reinforcement frame as recited in claim 1 wherein further comprising at least one longitudinal reinforcement member located inside the reinforcement frame hollow portion and secured to the reinforcement frame hollow portion.

8. The reinforcement frame as recited in claim 1 wherein the longitudinal reinforcement member has an omega-shaped cross-section.

9. A reinforced battery pack for an electric or hybrid vehicle comprising: a plurality of battery cells and the reinforcement frame as recited in claim 1.

10. The reinforced battery pack as recited in claim 9 wherein the reinforced battery pack is attached to the body of the electric or hybrid vehicle at least in the fastening portion.

11. The reinforced battery pack as recited in claim 9 further comprising a shield element provided to avoid intrusion into the battery pack, the shield element being attached to the fastening portion of the reinforced battery pack.

12. The reinforced battery pack as recited in claim 9 wherein the reinforcement frame has a cover portion extending from the reinforcement frame hollow portion and further comprising a top cover secured to the reinforcement frame by attaching the top cover to the cover portion.

13. A method for assembling a reinforced battery pack as recited in claim 9 attached to a body of an electric or hybrid vehicle, the body extending along a longitudinal axis and including a floor, at least a pair of rear members and a pair of front members, the pairs being opposite to each other and being provided to absorb rear and frontal shocks, and two side sills opposite to each other secured to the floor and provided to absorb lateral shocks, the process comprising the steps of:
    providing the plurality of battery cells;
    providing the inner and outer part;
    positioning the inner part around the battery cells;
    attaching the fastening section of the outer part to the pair of side sills in such a way that corners of the outer part located towards a front of the vehicle are adjacent to a rear end of the front members and corners of the outer part located towards a rear of the vehicle are adjacent to a front end of the rear members; and
    attaching the fastening section of the inner part to the fastening section of the outer part so as to form the reinforcement frame having the fastening portion attached to the body of the hybrid or electric vehicle and the hollow portion surrounding the battery cells.

14. A method for assembling a reinforced battery pack as recited in claim 9 attached to a body of an electric or hybrid vehicle, the body extending along a longitudinal axis and including a floor, at least a pair of rear members and a pair of front members, the pairs being opposite to each other and being provided to absorb rear and frontal shocks, and two side sills opposite to each other secured to the floor and provided to absorb lateral shocks, the process comprising the steps of:
    providing the plurality of battery cells;

providing the inner and outer part;

attaching the fastening sections of the inner and outer parts to one another so as to form the reinforcement frame having the fastening portion and the hollow portion;

positioning the reinforcement frame around the battery cells; and attaching the fastening portion to the pair of side sills in such a way that corners of the reinforcement frame located towards a front of the vehicle are adjacent to a rear end of the front members and corners of the reinforcement frame located towards a rear of the vehicle are adjacent to a front end of the rear members.

* * * * *